(12) United States Patent
Nishimura

(10) Patent No.: US 9,435,968 B1
(45) Date of Patent: Sep. 6, 2016

(54) OPTICAL REPEATER AND OPTICAL CONNECTOR DEVICE

(71) Applicant: FUJIKURA LTD., Koto-ku, Tokyo (JP)

(72) Inventor: Akito Nishimura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/055,717

(22) Filed: Feb. 29, 2016

(30) Foreign Application Priority Data

Mar. 25, 2015 (JP) .................. 2015-062345

(51) Int. Cl.
| | |
|---|---|
| *G02B 6/36* | (2006.01) |
| *G02B 6/42* | (2006.01) |
| *H04B 10/29* | (2013.01) |
| *G02B 6/30* | (2006.01) |
| *G02B 6/38* | (2006.01) |
| *G02B 6/32* | (2006.01) |

(52) U.S. Cl.
CPC .............. *G02B 6/4267* (2013.01); *G02B 6/30* (2013.01); *G02B 6/32* (2013.01); *G02B 6/3845* (2013.01); *G02B 6/3882* (2013.01); *G02B 6/3885* (2013.01); *G02B 6/4292* (2013.01); *H04B 10/29* (2013.01)

(58) Field of Classification Search
CPC  G02B 6/4292; G02B 6/4246; G02B 6/4249; G02B 6/4214
USPC .......................................... 385/53, 88, 89, 90
See application file for complete search history.

(56) References Cited

U.S. PATENT DOCUMENTS

| | | | |
|---|---|---|---|
| 7,334,946 B2 * | 2/2008 | Lu ..................... | G02B 6/4206 385/52 |
| 7,927,976 B2 * | 4/2011 | Menard ................. | B82Y 10/00 101/368 |
| 2010/0135618 A1 | 6/2010 | Howard et al. | |

* cited by examiner

*Primary Examiner* — Jennifer Doan
(74) *Attorney, Agent, or Firm* — Sughrue Mion, PLLC

(57) ABSTRACT

An optical repeater to be arranged between a substrate and an optical connector, the optical repeater includes: a body part including a plurality of optical paths to transmit an optical signal between the substrate and the optical connector, a substrate-side end-face in which one end of each of the optical paths opposes the substrate, and a connector connecting part to connect another end of each of the optical paths to the optical connector, the body part being configured from a material with a greater coefficient of linear expansion than that of the substrate; and a reinforcing member arranged so as to surround the optical paths in a side to the substrate-side end-face, the reinforcing member being configured from a material with a smaller coefficient of linear expansion than that of the body part.

8 Claims, 8 Drawing Sheets

OPTICAL REPEATER AND OPTICAL CONNECTOR DEVICE

CROSS-REFERENCE TO RELATED APPLICATIONS

The present application claims priority upon Japanese Patent Application No. 2015-062345 filed on Mar. 25, 2015, which is herein incorporated by reference.

BACKGROUND

1. Technical Field

The present invention relates to optical repeaters and optical connector devices.

2. Related Art

It has been known to position an optical connector (for example, a ferrule) that holds end parts of optical fibers and a substrate, and to optically connect optical elements on the substrate and the optical fibers. For example, in U.S. Patent Application Publication No. 2010/0135618, there is disclosed positioning a ferrule (reference sign 20 in U.S. Patent Application Publication No. 2010/0135618) and a receptacle on a substrate (reference sign in the above-mentioned document) and optically connecting photoelectric conversion elements on the substrate and optical fibers.

When magnitude of coefficient of linear expansion of the optical connectors and coefficient of linear expansion of the substrate are different from each other, due to the difference in coefficient of linear expansion during temperature change, there is a possibility that misalignment may occur.

SUMMARY

The present invention has an objective to suppress misalignment.

An aspect of the invention is an optical repeater to be arranged between a substrate and an optical connector, the optical repeater including:

a body part including a plurality of optical paths to transmit an optical signal between the substrate and the optical connector, a substrate-side end-face in which one end of each of the optical paths opposes the substrate, and a connector connecting part to connect another end of each of the optical paths to the optical connector, the body part being configured from a material with a greater coefficient of linear expansion than that of the substrate; and a reinforcing member arranged so as to surround the optical paths in a side to the substrate-side end-face, the reinforcing member being configured from a material with a smaller coefficient of linear expansion than that of the body part.

Other features of the present invention will be made clear through the present specification with reference to the accompanying drawings.

DESCRIPTION OF EXEMPLARY EMBODIMENTS

Figure 1:
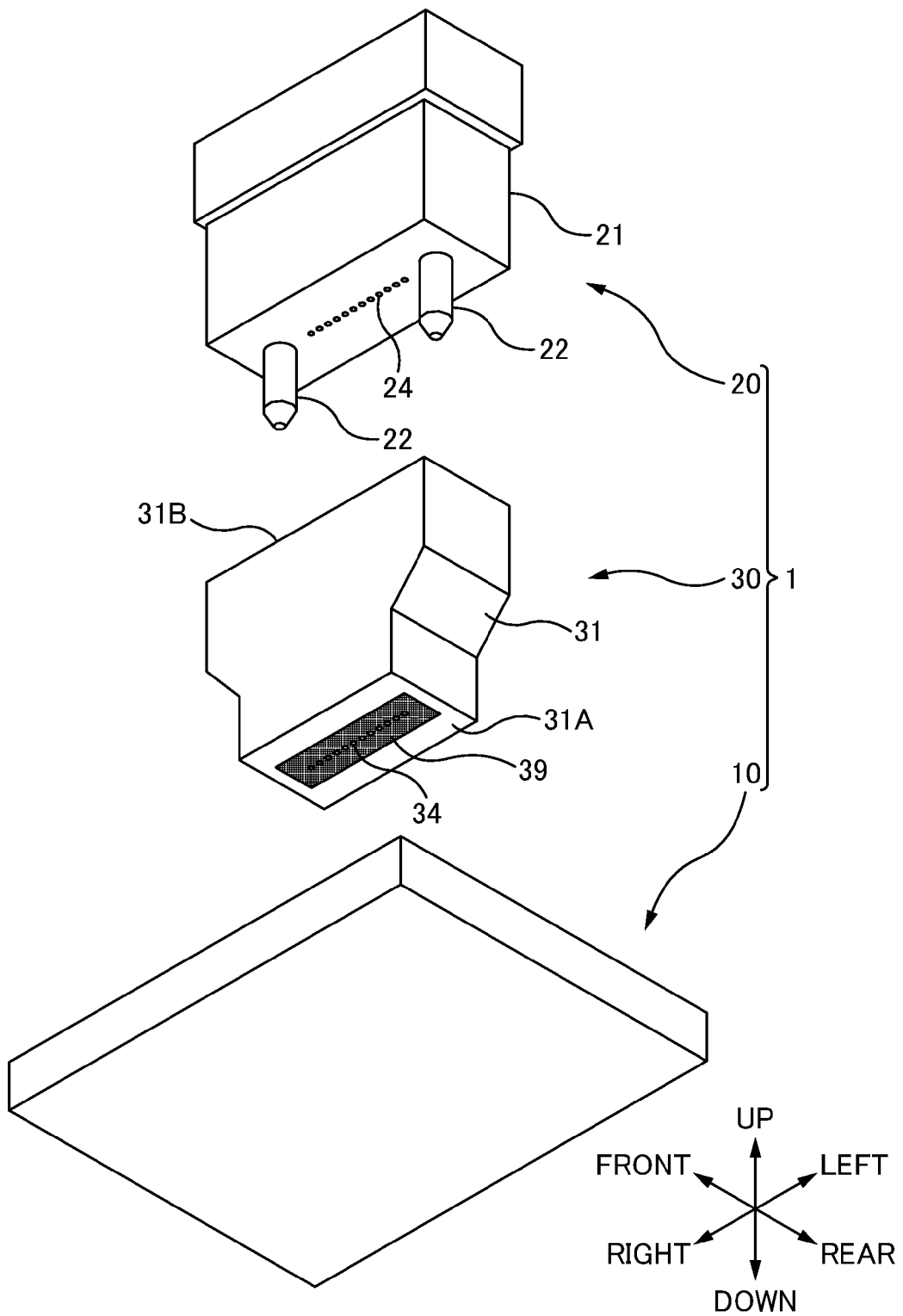
FIG. 1 is a perspective view of an optical connector device 1 of a first embodiment as seen from below.

At least the following matters will become clear through the description of the present specification and the accompanying drawings.

An optical repeater to be arranged between a substrate and an optical connector will become clear, the optical repeater including: a body part including a plurality of optical paths to transmit an optical signal between the substrate and the optical connector, a substrate-side end-face in which one end of each of the optical paths opposes the substrate, and a connector connecting part to connect another end of each of the optical paths to the optical connector, the body part being configured from a material with a greater coefficient of linear expansion than that of the substrate; and a reinforcing member arranged so as to surround the optical paths in a side to the substrate-side end-face, the reinforcing member being configured from a material with a smaller coefficient of linear expansion than that of the body part.

According to such an optical repeater, misalignment due to the difference in coefficient of linear expansion between a substrate and an optical connector during temperature change can be suppressed.

The substrate-side end-face may be arranged with a plurality of end-faces of optical fibers configuring the optical paths, and the reinforcing member may be configured so as to surround a periphery of the plurality of the optical fibers. In this way, misalignment can be suppressed.

The reinforcing member may be configured so as to surround a periphery of each of the plurality of the optical fibers. In this way, relative misalignment of optical fibers with each other can be suppressed.

Preferably, the substrate-side end-face is provided with a recess and a plurality of lens parts that have been formed in the optical paths of the recess, and the reinforcing member is configured so as to surround a periphery of the end-faces of the plurality of the optical fibers configuring the optical paths, a periphery of the plurality of the lens parts, and a light transmission part configuring the optical paths between the end-faces of the optical fibers and the lens parts. In this way, misalignment in an end-face of each of optical fibers and misalignment in a lens part can be both suppressed.

The substrate-side end-face may be provided with a positioning part that engages with a substrate side positioning part that has been formed in the substrate. In this way, a substrate and an optical repeater can be passively aligned.

Preferably, the reinforcing member is configured so as to surround the optical paths and the positioning part. In this way, relative misalignment between a positioning part and an optical path (optical fiber) can be suppressed.

The substrate-side end-face may be provided with the plurality of the lens parts that have been formed in the optical paths, the body part may have a reflecting part that changes the optical paths between the end-faces of the optical fibers configuring the optical paths and the lens parts, the plurality of the optical fiber end-faces and the reflecting part may be arranged sandwiched with the two reinforcing members, and one of the two reinforcing members may be configured so as to surround a periphery of the plurality of the lens parts. In this way, misalignment can be suppressed and an optical path can be changed.

Further, an optical connector device will become clear including: a substrate; an optical connector; and an optical repeater to be arranged between the substrate and the optical connector, wherein the optical repeater includes a body part including a plurality of optical paths to transmit an optical signal between the substrate and the optical connector, a substrate-side end-face in which one end of each of the optical paths opposes the substrate, and a connector connecting part to connect another end of each of the optical paths to the optical connector, the body part being configured from a material with a greater coefficient of linear expansion than that of the substrate, and a reinforcing member arranged so as to surround the optical paths in a side to the substrate-side end-face, the reinforcing member being configured from a material with a smaller coefficient of linear expansion than that of the body part.

First Embodiment

Figure 2A:
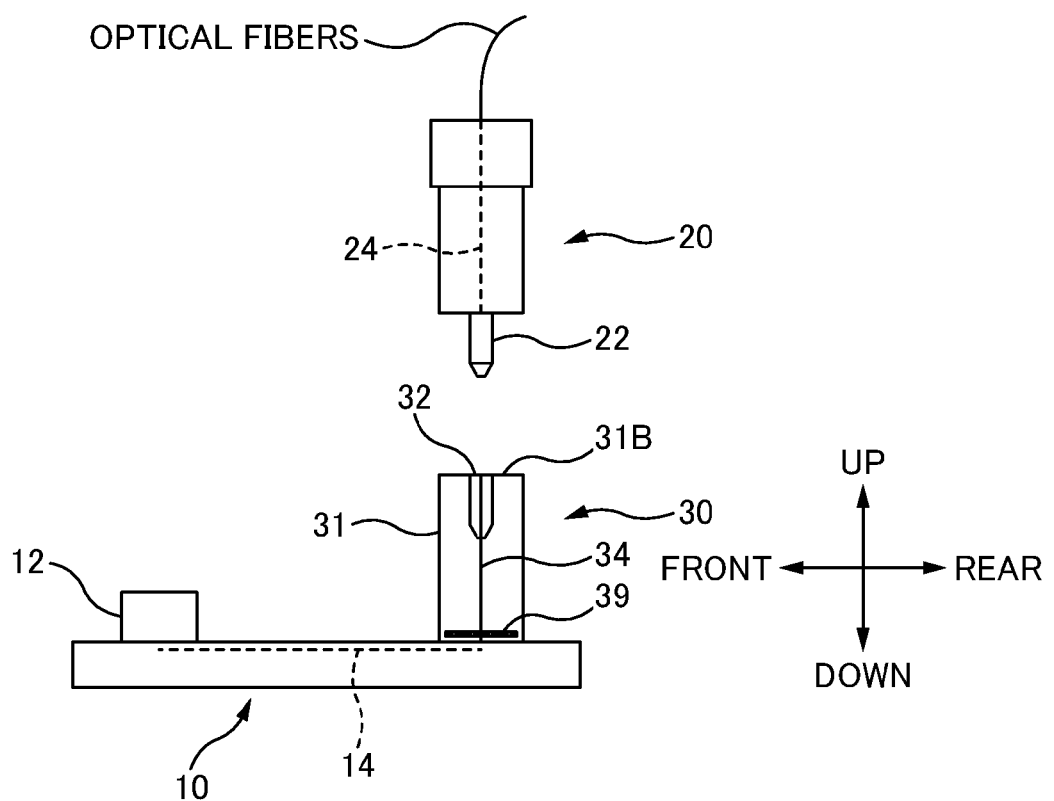
FIG. 2A is a view seen from a side.
Figure 2B:
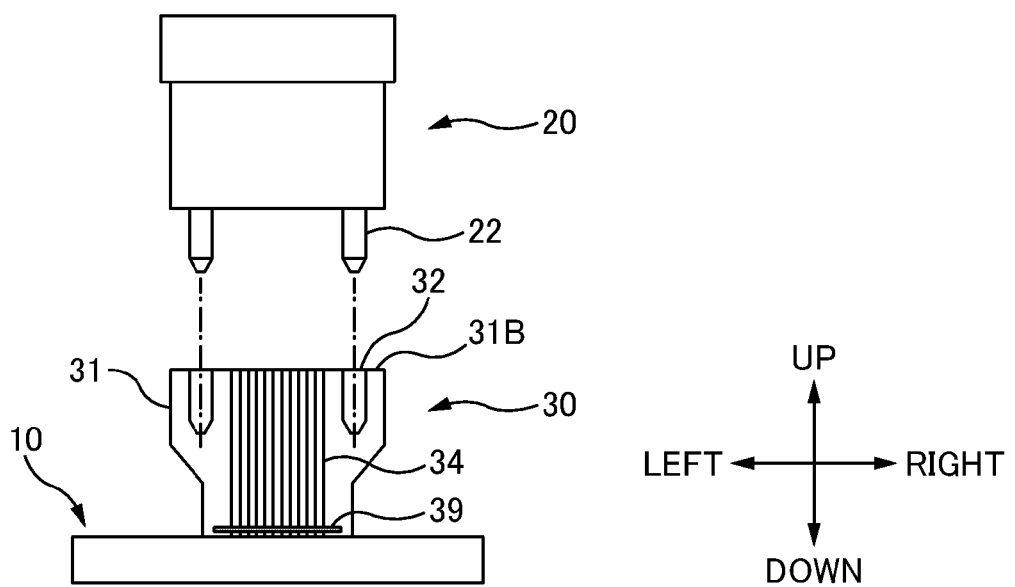
FIG. 2B is a view seen in a front-rear direction.

FIG. 1 is a perspective view of an optical connector device 1 of a first embodiment as seen from below. Further, FIG. 2A is a view seen from a side, and FIG. 2B is a view seen from a front-rear direction. FIG. 2A and FIG. 2B show a partial section as transparent, for the sake of explanation.

In the below explanation, each direction is defined as shown in the drawings. In other words, a direction perpendicular to alight guide substrate 10 is referred to as an "up-down direction" and a side to which an optical connector 20 is to be attached to the light guide substrate 10 is referred to as "up", and an opposite side is referred to as "down".

Further, a direction in which two positioning holes 32 and positioning pins 22 are aligned is referred to as a "left-right direction". A direction in which a plurality of optical fibers configuring an optical fiber tape are aligned (in other words, an alignment direction of a plurality of optical fiber holes 24) is referred to as the "left-right direction".

Further, a direction which is perpendicular to the left-right direction and the up-down direction is referred to as a "front-rear direction". A side with an optical element 12 in respect to an attachment position of an optical repeater 30 on the light guide substrate 10 is referred to as "front", and an opposite side is referred to as "rear" (refer to FIG. 2A).

The optical connector device 1 of this embodiment includes the light guide substrate 10, the optical connector 20, and the optical repeater 30.

As shown in FIG. 2A, the light guide substrate 10 includes the optical element 12 and a light guide 14. In the case that the optical element 12 is a light emitting element, an optical signal sent from the optical element 12 is transmitted through the light guide 14, and then an optical path is changed to a perpendicular direction to the light guide substrate 10 with a mirror part and outputted. In this way, the optical repeater 30 that has been mounted on the mirror part and the optical connector 20 are optically connected. In the case where the optical element 12 is a light receiving element, the optical signal is transmitted in an opposite optical path. In this way, the light guide substrate 10 inputs and outputs the optical signal to a direction perpendicular to the substrate (the up-down direction).

The light guide substrate 10 of this embodiment is a silicone substrate and has a small coefficient of linear expansion.

The optical connector 20 is a member that holds end parts of optical fibers transmitting optical signals, and here an MT ferrule (JIS C5981) is being used. The optical connector 20 includes a body part 21, two positioning pins 22, and a plurality of optical fiber holes 24.

The body part 21 is formed from resin. Inside the body part 21, a plurality of optical fiber end parts are to be held. Then, a lower side end-face of the body part 21 is to be a connecting end-face that connects with the optical repeater 30.

The positioning pins 22 are sections to perform alignment with the optical repeater 30. The positioning pins 22 are provided to protrude to a lower side from a lower side end-face of the body part 21. Further, the two positioning pins 22 are provided with an interval in the left-right direction so as to sandwich the plurality of the optical fiber holes 24.

The optical fiber holes 24 are holes in which end parts of the optical fibers are to be inserted. The optical fiber holes 24 are to be inserted with bare fibers that have been removed of covering from the optical fiber cores. As a result, the optical fiber holes 24 will be sections to form optical paths inside the body part 21. The optical fiber holes 24 penetrate through the body part 21 in the up-down direction, and the optical fiber end-faces are exposed in the lower side end-face (connecting end-face). The plurality of the optical fiber holes 24 are parallel to the up-down direction. The plurality of optical fiber holes 24 that are parallel to each other are to be aligned in the left-right direction.

The body part 21 of the optical connector 20 is made of resin as described above, and the coefficient of linear expansion is large. Thus, when the optical element 12 (the light guide substrate 10) and the optical connector 20 are directly connected, misalignment occurs due to the difference in the coefficient of linear expansion during temperature change, and signal loss becomes great (in particular, misalignment becomes great in the left and right ends, and signal loss increases).

In this embodiment, the optical element 12 (the light guide substrate 10) and the optical connector 20 are connected via the optical repeater 30.

The optical repeater 30 is arranged between the light guide substrate 10 and the optical connector 20, and is a member to transmit optical signals between the light guide substrate 10 and the optical connector 20. The optical repeater 30 has a body part 31 and a reinforcing member 39.

The body part 31 is a section other than the reinforcing member 39 of the optical repeater 30, and is formed of the same resin as the body part 21 of the optical connector 20 in this embodiment.

The body part 31 includes an element-side end-face 31A (a lower surface), a connector-side end-face 31B (an upper surface), two positioning holes 32, and a plurality of optical fiber holes 34.

The element-side end-face 31A (corresponds to the substrate-side end-face) is an end-face to a lower side of the body part 31 (the lower surface) and is a connecting end-face with the light guide substrate 10. The element-side end-face 31A (and, a connector-side end-face 31B to be described later) is formed with a plurality of optical fiber holes 34 aligned in the left-right direction.

The optical fiber holes 34 are provided penetrating through the body part 31 in the up-down direction. Further, a plurality of the optical fiber holes 34 are provided aligned in the left-right direction so as to correspond to the plurality of the optical fiber holes 24 of the optical connector 20. Each of the optical fiber holes 34 is arranged with an optical fiber to transmit optical signals between the light guide substrate 10 and the optical connector 20. In other words, the optical repeater 30 is provided with a plurality of optical paths to transmit optical signals between the light guide substrate 10 and the optical connector 20.

The optical fiber holes 34 in the element-side end-face 31A are arranged each with one end of the optical fibers (optical paths) and oppose the light guide substrate 10. Then, by performing aligning of the light guide substrate 10 (input and output positions of optical signals) and the element-side end-face 31A (optical fibers) of the optical connector 30, the optical signals are to be transmitted. In this embodiment, aligning of the light guide substrate 10 and the optical connector 30 is performed by active aligning. In other words, the position of the body part 31 is shifted gradually with respect to the light guide substrate 10, and is fixed with an adhesive and the like in a position with best signal transmission of optical signals. Thus, positioning holes (or positioning pins) are not provided to the element-side end-face 31A. In this way there are no positioning holes in the element-side end-face 31A, thus the element-side end-face 31A is made smaller compared to the connector-side end-face 31B. Thus, after fixing the element-side end-face 31A with respect to the light guide substrate 10, misalignment does not easily occur.

The connector-side end-face 31B is an end-face (an upper surface) to an upper side of the body part 31, and is a connecting end-face with the optical connector 20. The connector-side end-face 31B is formed with two positioning holes 32 (corresponds to connector connecting part) and a plurality of optical fiber holes 34. The optical fiber holes 34 in the connector-side end-face 31B are each arranged with the other end of the optical fiber (optical path).

The positioning holes 32 are holes to perform positioning with the optical connector 20, and are provided as shapes corresponding to positioning pins 22 of the optical connector 20. By making the positioning pins 22 of the optical connector 20 engage with the positioning holes 32, the optical connector 20 and the optical repeater 30 (in particular the connector-side end-face 31B) are to be positioned. In this way, the optical fiber end-faces that are exposed in the connector-side end-face 31B are connected with the optical fiber end-faces to the lower side end-face of the optical connector 20.

The reinforcing member 39 is a member with a smaller coefficient of linear expansion than the body part 31, and is a member to suppress expansion and contraction of the body part 31. As the material with a smaller coefficient of linear expansion than the resin configuring the body part 31, it is possible to use, for example, such as zirconia, a ceramic material such as alumina, a metal material such as cemented carbide or iron, glass, and silicone.

The material of the reinforcing member 39 is preferably the same, or is approximately the same as the material of the light guide substrate 10 (silicone) which is to be connected with the optical repeater 30. In this embodiment, silicone is used as the reinforcing member 39.

By arranging the reinforcing member 39 in a chamber of a mold during shaping resin of the body part 31, the reinforcing member 39 can be buried and formed (insert molded) in the body part 31 that is a resin mold. In the case where the reinforcing member 39 is to be arranged to the outer surface of the body part 31, the reinforcing member 39 can be attached after forming the body part 31.

The reinforcing member 39 is provided to the side near to the light guide substrate 10 of the optical repeater 30 (the side of the element-side end-face 31A). Since the coefficient of linear expansion of the reinforcing member 39 is the same (or is a similar degree) as the coefficient of linear expansion of the light guide substrate 10, misalignment during temperature change can be suppressed.

Figure 3A:
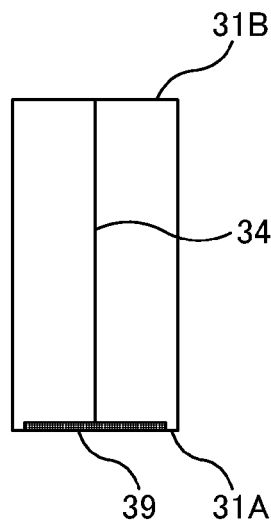
FIG. 3A and FIG. 3B are explanatory views of arrangement positions of a reinforcing member 39.
Figure 3B:
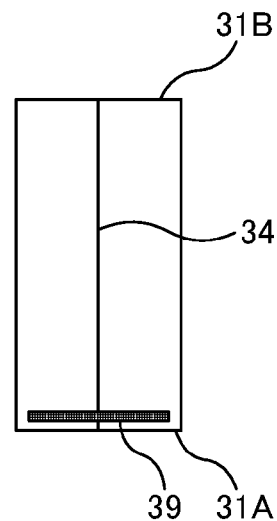

FIG. 3A and FIG. 3B are explanatory views of arrangement positions of the reinforcing member 39. FIG. 3A and FIG. 3B are also shown as partially transparent for the sake of description.

As shown in FIG. 3A, the reinforcing member 39 may be positioned in the element-side end-face 31A. Further, as shown in FIG. 3B, the reinforcing member 39 may be buried near the element-side end-face 31A. In any case, since the coefficient of the linear expansion of the reinforcing member 39 is the same (or approximately the same) as that of the light guide substrate 10, misalignment during temperature change can be suppressed. Since the body part 31 is formed with the same resin as that of the body part 21 of the optical connector 20 (since the coefficient of linear expansion is the same), misalignment can be suppressed to the side of the connector-side end-face 31B.

Figure 4A:
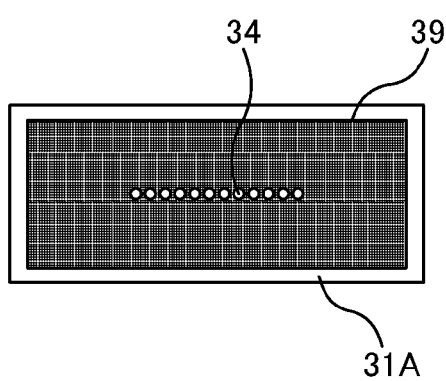
FIG. 4A to FIG. 4C are explanatory views of arrangement examples of a reinforcing member 39.
Figure 4B:
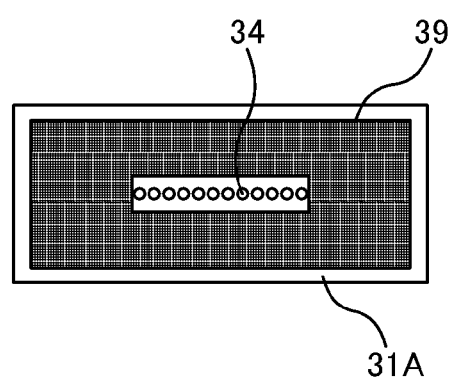
Figure 4C:
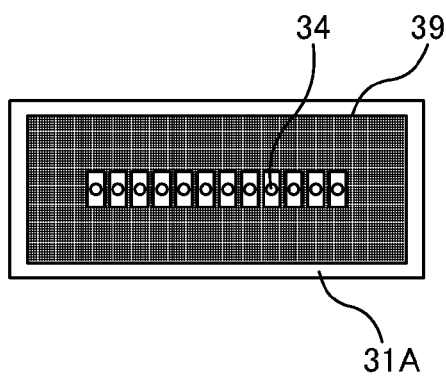

FIG. 4A to FIG. 4C are explanatory views showing arrangement examples of the reinforcing member 39.

As shown in FIG. 4A, the periphery of each of the optical fiber holes 34 (in other words optical fibers) may be surrounded with the reinforcing member 39. In this case, the relative misalignment of the optical fiber holes 34 with each other can be suppressed.

As shown in FIG. 4B, the entire periphery of the plurality of the optical fiber holes 34 can be surrounded by the reinforcing member 39. Also in this case, the misalignment can be suppressed, compared to the case where the reinforcing member 39 is not provided.

As shown in FIG. 4C, a range larger than an optical fiber hole 34 may each be surrounded with the reinforcing member 39.

In FIG. 4A to FIG. 4C, the case where the reinforcing member 39 is positioned in the element-side end-face 31A is shown, and it is the same for the case where the reinforcing member 39 is buried near the element-side end-face 31A (refer to FIG. 3B).

As described above, the optical connector device 1 of this embodiment includes the light guide substrate 10 with a small coefficient of linear expansion, the optical connector 20 with a large coefficient of linear expansion, and the optical repeater 30 arranged between the light guide substrate 10 and the optical connector 20. The optical repeater 30 includes the body part 31 and the reinforcing member 39. The body part 31 has the plurality of optical fiber holes 34 (optical fibers) to transmit optical signals between the light guide substrate 10 and the optical connector 20, the element-side end-face 31A in which one end of each of the optical fibers oppose the light guide substrate 10, and the positioning holes 32 to connect the other end of each of the optical fibers to the optical fiber holes 24 of the optical connector 20, and the body part 31 is configured of a resin with a greater coefficient of linear expansion than that of the light guide substrate 10. The reinforcing member 39 is arranged to surround the optical fiber holes 34 (the optical fibers) in the side of the element-side end-face 31A, and is configured from silicone with a smaller coefficient of linear expansion than that of the body part 31. In this way, even when the coefficient of linear expansion of the light guide substrate 10 and the optical connector 20 are different from each other, misalignment due to the difference in the coefficient of linear expansion during temperature change can be suppressed.

Second Embodiment

Figure 5:
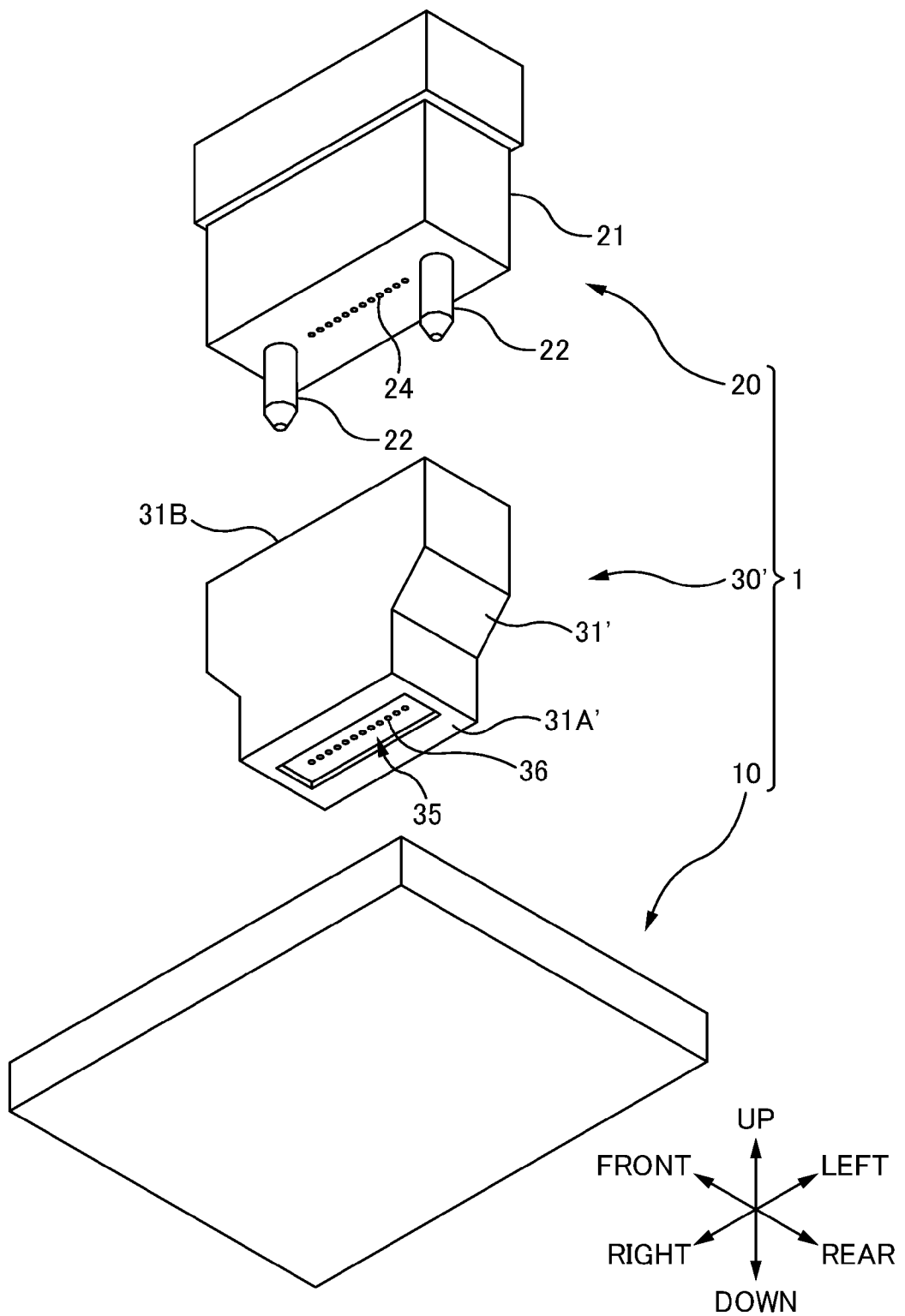
FIG. 5 is a perspective view of an optical connector device 1 of a second embodiment as seen from below.

FIG. 5 is a perspective view of an optical connector device 1 of a second embodiment as seen from below. In FIG. 5, the same configuring sections as in the first embodiment (FIG. 1) are added the same reference signs and explanation of these parts will be omitted.

An optical repeater 30 in the second embodiment includes a main body part 31'. The main body part 31' is formed with a transparent resin that can transmit optical signals, and also in the second embodiment, coefficient of linear expansion of the main body part 31' is greater than coefficient of linear expansion of a light guide substrate 10. Optical fiber end-faces are not exposed in an element-side end-face 31A' of the main body part 31', and a recess 35 and lens parts 36 are provided.

The recess 35 is a section depressed with respect to the element-side end-face 31A', and is rectangular shaped, long, and narrow in a left-right direction so as to correspond to a plurality of optical fiber holes 34.

The lens parts 36 are provided in a bottom surface (here an upper surface) of the recess 35. Because there is the recess 35, the lens parts 36 and the light guide substrate 10 are non-contacting. The lens part 36 is a collimating lens, and a parallel light (collimated light) is input and output between the lens parts 36 and the light guide substrate 10. In the second embodiment, the optical fiber holes 34 (optical fibers) are provided near to the recess part 35 (refer to FIG. 6), and the lens part 36 is provided corresponding to each of the plurality of the optical fiber holes 34 (in other words the plurality of the optical fibers). As described above, since the main body 31' is formed with a light transmitting resin, optical paths are formed in a section between the optical fiber end-faces and the lens parts 36 (a light transmission part 37 in FIG. 6B). That is to say, the lens parts 36 are formed in the optical paths of the recess part 35, and optical signals are to be input and output via the lens parts 36.

Figure 6A:
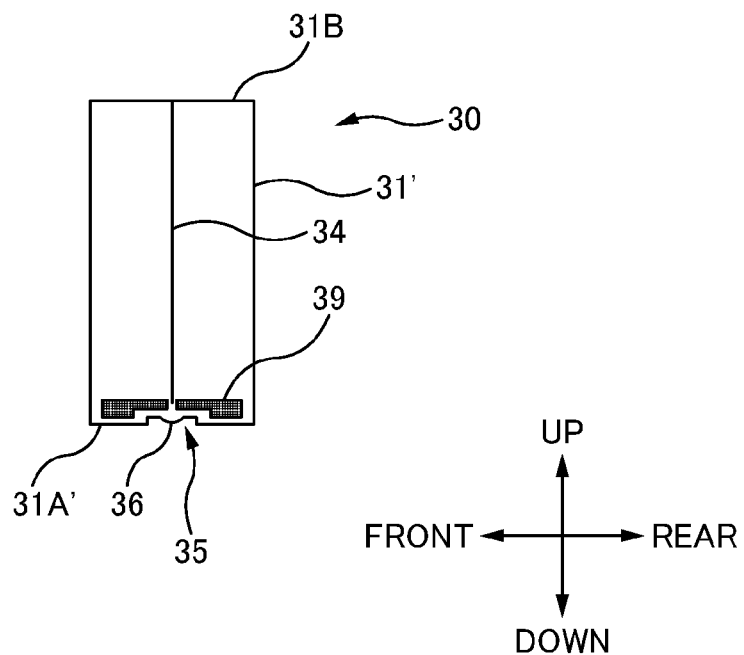
FIG. 6A and FIG. 6B are views showing arrangement examples of a reinforcing member 39 in a second embodiment.
Figure 6B:
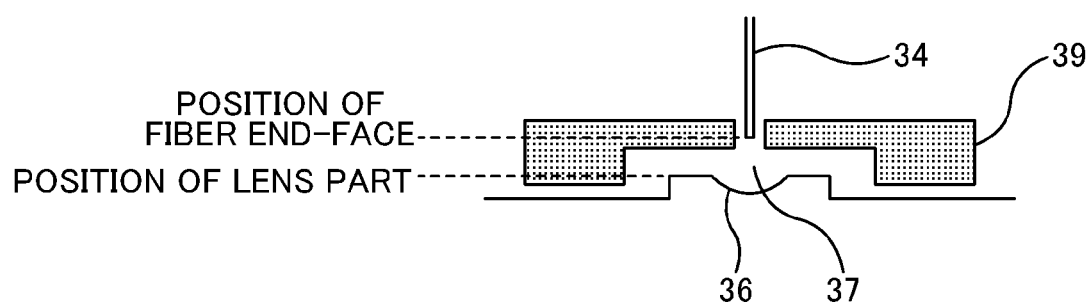

FIG. 6A and FIG. 6B are figures showing arrangement examples of a reinforcing member 39 in the second embodiment.

Supposing that in the second embodiment, the reinforcing member 39 is provided in the element-side end-face 31A of the optical repeater 30 as in FIG. 3A, because the lens parts 36 are in the recess 35 in the second embodiment, positions of the lens parts 36 and the optical fiber end-faces may become misaligned during temperature change. Further, merely by surrounding the periphery of the optical fiber end-faces, the position of the lens parts 36 may become misaligned during temperature change.

In the second embodiment, the reinforcing member 39 surrounds both the periphery of the plurality of the lens parts 36 and the periphery of the plurality of the optical fiber end-faces. Specifically, in the position of the lens parts in FIG. 6B, the reinforcing member 39 is arranged in the periphery of the lens part 36, and also in the position of the fiber end-face in FIG. 6B the reinforcing member 39 is arranged in the periphery of the fiber end-faces. Further, the light transmission part 37 configuring the optical paths between the lens parts 36 and the end-faces of the optical fibers is also surrounded. In other words, as shown in FIG. 6B, the reinforcing member 39 is buried so as to surround the end parts of the optical fiber holes 34 (optical fiber end-faces) and the light transmission part 37 (optical paths between the optical fiber end-faces and the lens parts 36) and also to protrude to the side of an element-side end-face 31A' of the recess 35 to surround the periphery of the lens parts 36.

By arranging the reinforcing member 39 in this way, misalignment in the end-faces of the optical fibers, and misalignment of the lens parts 36 can be suppressed, and in the second embodiment misalignment can also be suppressed.

Third Embodiment

In the above described first embodiment and second embodiment, the optical repeater had been actively aligned with the light guide substrate. In a third embodiment, an optical repeater will be passively aligned with a light guide substrate.

Figure 7:
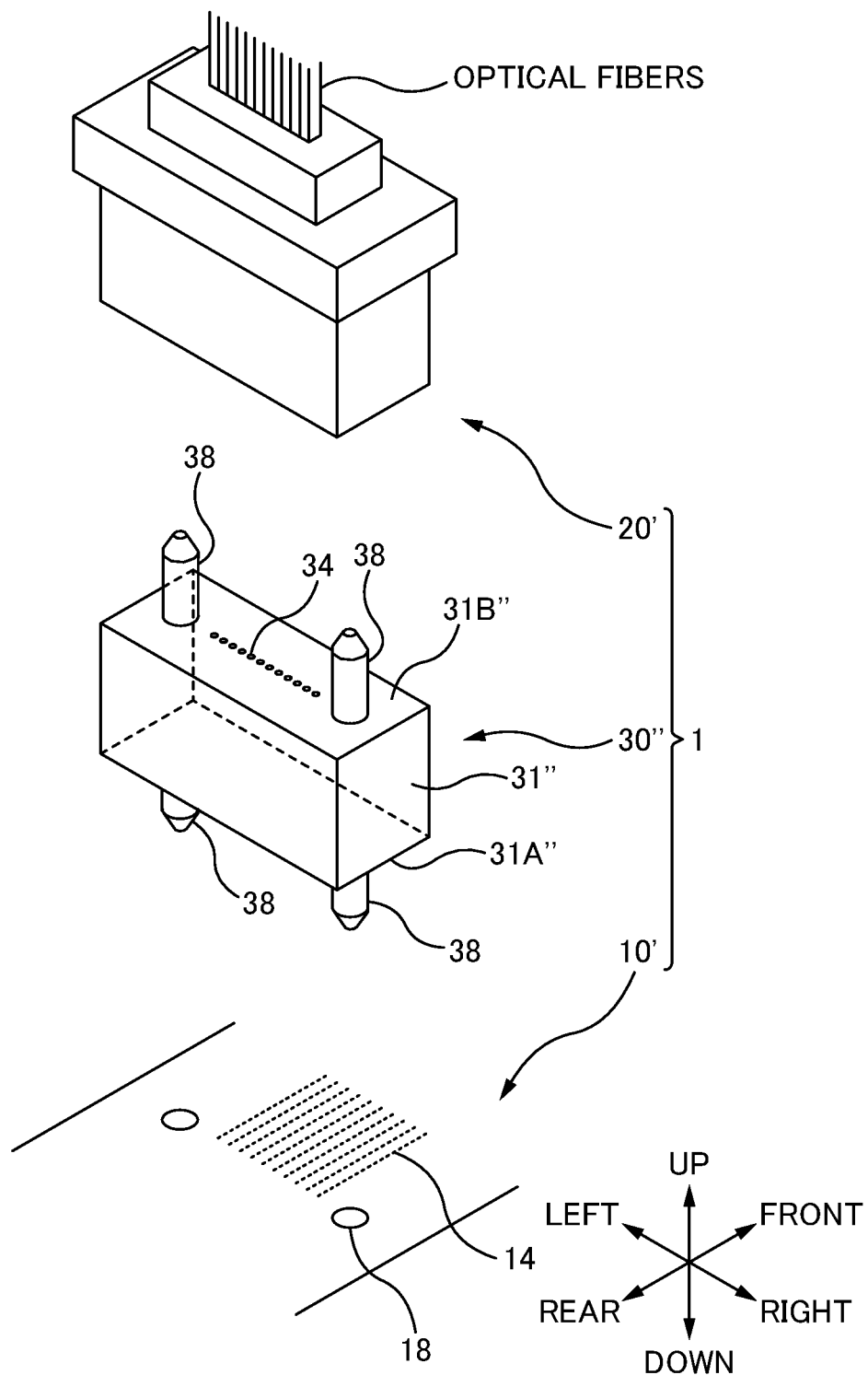
FIG. 7 is a perspective view of an optical connector device 1 of a third embodiment as seen from above.

FIG. 7 is a perspective view of an optical connector device 1 in the third embodiment as seen from above. The optical connector device 1 of the third embodiment includes a light guide substrate 10', an optical connector 20', and an optical repeater 30". The same configuring sections as in the above-mentioned embodiments will be added the same reference signs and description of these parts will be omitted.

The light guide substrate 10' in the third embodiment is formed with two positioning holes 18 (corresponds to substrate side positioning parts) so as to sandwich end parts (mirror parts) of a plurality of light guides 14 in the left-right direction. Further, two positioning holes (not shown) have been formed in a lower side end-face of the optical connector 20'.

A body part 31" of the optical repeater 30" in the third embodiment includes an element-side end-face 31A", a connector-side end-face 31B", positioning pins 38, and optical fiber holes 34.

With regard to the body part 31" in the third embodiment, as will be described later on, the positioning pins 38 protrude from the element-side end-face 31A" and the connector-side end-face 31B". For this reason, the element-side end-face 31A" and the connector-side end-face 31B" have the same shape, and the body part 31" is in a rectangular shape.

The optical fiber holes 34 are provided penetrating the body part 31" (between the element-side end-face 31A" and the connector-side end-face 31B") in the up-down direction, as similar to in the first embodiment. Further, the plurality of the optical fiber holes 34 are provided aligned in the left-right direction, and each of the optical fiber holes 34 is provided with an optical fiber.

The two positioning pins 38 are provided so as to sandwich the plurality of the optical fiber holes 34 in the left-right direction. Further, the positioning pins 38 penetrate through the body part 31" of the optical repeater 30" in the up-down direction, and each protrude from the element-side end-face 31A" (a lower side) and the connector-side end-face 31B" (an upper side). In this embodiment, by making the positioning pins 38 penetrate through the optical repeater 30" in the up-down direction, the pins that protrude to the lower side and the pins that protrude to the upper side are configured from a same member.

By making the positioning pins 38 (corresponds to positioning parts) to the lower side (the side of the element-side end-face 31A") engage with the positioning holes 18 of the light guide substrate 10, the optical repeater 30 can be passively aligned in respect to the light guide substrate 10. Similarly, by making the positioning pins 38 to the upper side (the side of the connector-side end-face 31B") engage with positioning holes (not shown) of the optical connector 20, the optical repeater 30 can be passively aligned in respect to the optical connector 20.

Figure 8A:
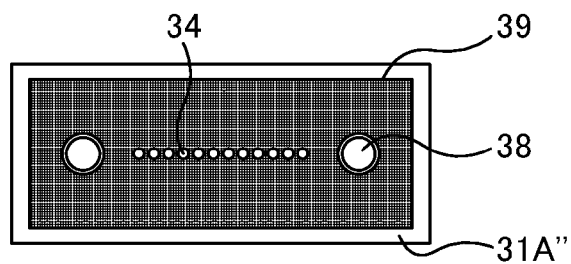
FIG. 8A to FIG. 8D are views showing arrangement examples of a reinforcing member 39 in a third embodiment.
Figure 8B:
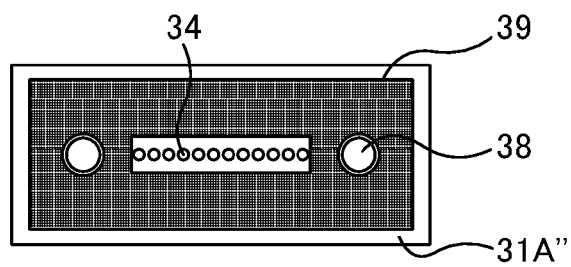

FIG. 8A and FIG. 8B are figures showing arrangement examples of the reinforcing member 39 in the third embodiment. In FIG. 8A, the periphery of each of the optical fiber holes 34 (in other words optical fibers) is surrounded with the reinforcing member 39, and in FIG. 8B, an entire periphery of the plurality of the optical fiber holes 34 is surrounded with the reinforcing member 39.

Further, in FIG. 8A and in FIG. 8B, the periphery of the two positioning pins 38 is also surrounded with the same reinforcing member 39. This is because, when the relative positional relationship of the positioning pins 38 and the optical fiber holes 34 is shifted due to temperature change, signal loss increases. As in the figure, by surrounding the periphery of the two positioning pins 38 with the same reinforcing member as that of the reinforcing member 39 surrounding the periphery of the optical fibers, the shift in the relative positions of the positioning pins 38 and the optical fiber holes 34 (optical fibers) can be suppressed.

Figure 8C:
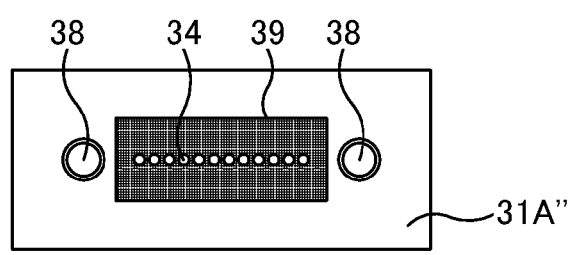
Figure 8D:
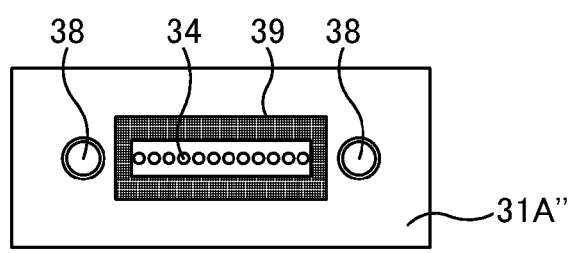

FIG. 8C and FIG. 8D are figures showing another example of arrangement of the reinforcing member 39 in the third embodiment.

As shown in the figures, the periphery of the positioning pins 38 does not have to be surrounded with the reinforcing member 39. When the periphery of the plurality of the optical fiber holes 34 are surrounded with the reinforcing member 39, the relative misalignment between the optical fiber holes 34 can be suppressed. Assuming that there is no reinforcing member 39, the optical fiber holes 34 to the left and right ends in particular easily become misaligned. On the contrary, when the periphery of the plurality of the optical fiber holes 34 is surrounded with the reinforcing member 39, such misalignment can be suppressed.

Although not shown, as similar to the first embodiment (FIG. 4C), a range larger than each optical fiber hole 34 may be surrounded each with the reinforcing member 39.

In this embodiment, by making the positioning pins 38 penetrate through the optical repeater 30" in the up-down direction, the pins that protrude to the lower side and the pins that protrude to the upper side are configured with the same member. It is not limited to the above, however, and the pins to the lower side and the pins to the upper side may be configured with different members. In this case, the projecting and depressing relationship between the pins and the positioning holes may be reversed. For example, the positioning pins may be provided to the lower side end-face of the optical connector 20' and the positioning holes may be provided to the connector-side end-face 31B" of the optical connector 30". Further, the positioning pins may be provided on the upper surface of the light guide substrate 10' and the positioning holes may be provided on the element-side end-face 31A" of the optical connector 30".

Fourth Embodiment

An optical repeater of a fourth embodiment is different from the above described embodiments in that it is an optical path changer that changes the optical path and has a reflecting part.

Figure 9A:
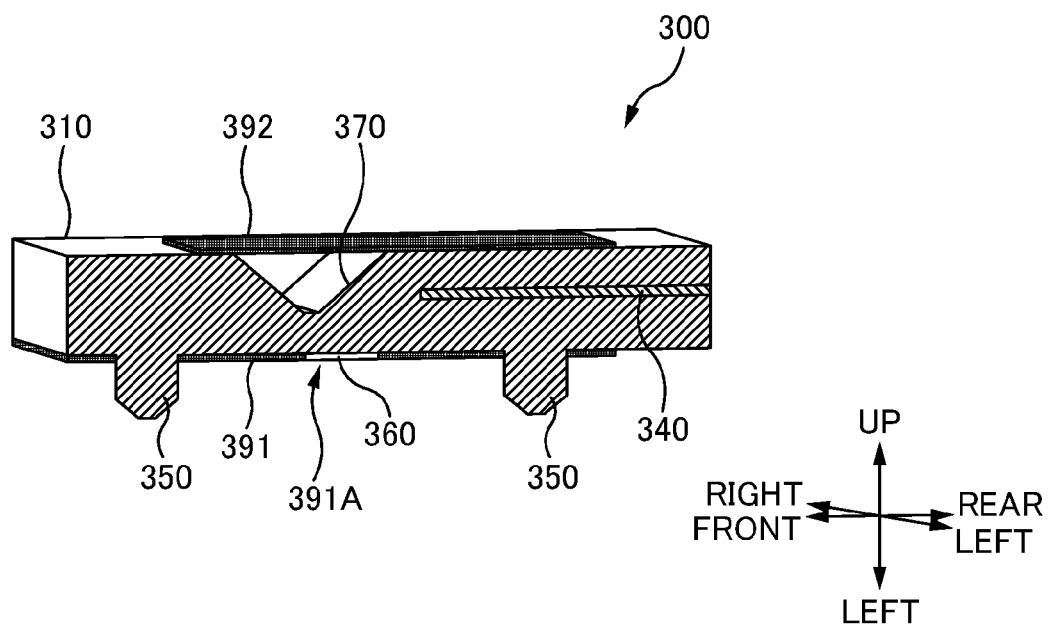
FIG. 9A is a sectional explanatory view of an optical repeater 300 in a fourth embodiment.
Figure 9B:
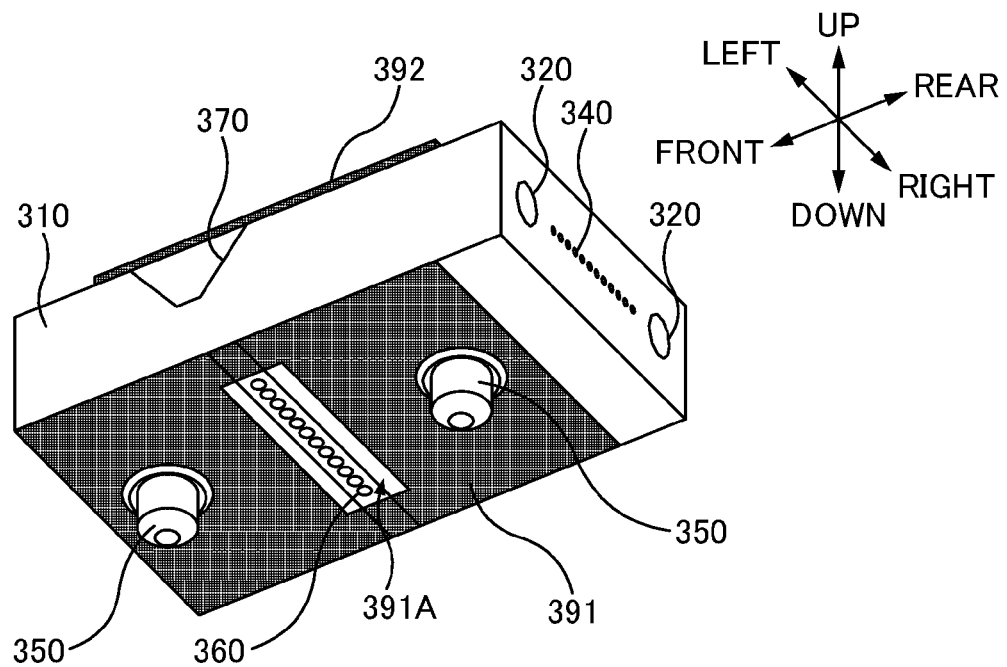
FIG. 9B is a perspective view of an optical repeater 300 in a fourth embodiment as seen from below.

FIG. 9A is a sectional explanatory view of an optical repeater 300 of the fourth embodiment. FIG. 9B is a perspective view of the optical repeater 300 of the fourth embodiment as seen from below. A light guide substrate (not shown) of the fourth embodiment is provided with positioning holes that engage with positioning pins 350. Further, the optical repeater 300 of the fourth embodiment is connected with the optical connector 20 of the first embodiment. The connection direction of the optical connector 20 is different from that in the first embodiment, however, and in the fourth embodiment, a rear side end-face of a body part 310 to be described later is to be a connecting end-face.

The optical repeater 300 (optical path changer) includes the body part 310, a lower side reinforcing member 391 and an upper side reinforcing member 392, which are reinforcing members.

The body part 310 configures a section other than the reinforcing members, and the body part 310 includes two positioning holes 320, a plurality of optical fiber holes 340, two positioning pins 350, an optical signal surface 360, and a reflecting face 370. The body part 310 is integrally formed with a transparent resin that can transmit optical signals.

The positioning holes 320 are holes to perform positioning with the optical connector 20, and two positioning holes 320 are provided, in the rear side end-face of the body part 310, so as to sandwich the plurality of the optical fiber holes 340 in the left-right direction. Then, by engaging the positioning pins 22 of the optical connector 20 in these positioning holes 320, the optical connector 20 and the optical repeater 300 are to be positioned.

The optical fiber holes 340 are formed along the front-rear direction, and optical fibers are inserted in advance in the optical fiber holes 340. Optical fiber end-faces are exposed in the rear side end-face of the body part 310. The plurality of the optical fiber holes 340 are formed aligned in the left-right direction. The plurality of the optical fiber holes 340 that are parallel to each other are aligned in the left-right direction.

The positioning pins 350 are pins (guide parts) to be inserted into the positioning holes in the light guide substrate, and the positioning pins 350 protrude from a lower surface of the body part 310. In this embodiment, the two positioning pins 350 are provided aligned in the front-rear direction. By inserting the positioning pins 350 into the positioning holes in the light guide substrate, the optical repeater 300 and the light guide substrate are to be aligned.

The optical signal surface 360 is a surface to which optical signals enter or exit, and the optical signal surface 360 is formed on the lower surface of the body part 310. A plurality of optical signals are to enter or exit from the optical signal surface 360. When the optical repeater 300 and the light guide substrate are aligned, the optical signal surface 360 of the body part 310 opposes an upper surface (a surface to which optical signals enter or exit) of a mirror part of the light guide substrate. The optical signal surface 360 is formed parallel to the left-right direction (an alignment direction in which the plurality of the optical fiber holes 340 are aligned). Further, the optical signal surface 360 is arranged between the two positioning pins 350. The optical signal surface 360 is formed with a recess along the left-right direction, and the recess is formed with a plurality of lenses. Each lens of the optical signal surface 360 is arranged on an optical path. Lens do not have to be arrange on the optical signal surface 360, and the optical signal surface 360 may be a flat surface.

The reflecting face 370 is a surface that reflects optical signals. An inclined end-face to the front side of the optical fiber holes 340 (optical fibers) is the reflecting face 370. A recess is formed in an upper surface of the body part 310, and an inclined end-face to the rear side of the recess is to be the reflecting face 370. The reflecting face 370 is a boundary surface between resin configuring the optical connector 300 and outside air, and light reflects on the boundary surface of the resin and the outside air due to the difference in the index of refraction of the resin and the outside air. The reflecting face 370 is formed parallel to the left-right direction (the alignment direction in which the plurality of optical fiber holes 340 are aligned). The reflecting face 370 may be a flat surface or may be a lens surface (a curved surface).

The optical signals that transmit through the body part 310 are to be reflected on the reflecting face 370. In the case where the optical signals exit from the end-faces of the optical fibers, the optical signals reflect on the reflecting face 370 and are to exit from the optical signal surface 360 toward the light guide substrate. Further, in the case where the optical signals enter the optical signal surface 360 from the light guide substrate, the optical signals reflect on the reflecting face 370 and are to enter the optical fiber end-faces. The optical paths in the body part 310 are bent at the reflecting face 370, and the plurality of the bent optical paths are to be aligned in the left-right direction. The optical paths in the body part 310 are to be a section that transmits optical signals between the optical signal surface 360 and the reflecting face 370 (the section parallel to the left-right direction and the up-down direction) and the section (the section parallel to the left-right direction and the front-rear direction) that transmits the optical signals between the reflecting face 370 and the optical fiber end-faces (rear side end-faces).

The lower side reinforcing member 391 and the upper side reinforcing member 392 are plate-like members with a smaller coefficient of linear expansion than the body part 310, and are members to suppress expansion and contraction of the body part 310.

The lower side reinforcing member 391 and the upper side reinforcing member 392 are plate-like members that are parallel to each other in the left-right direction (the aligning direction in which the plurality of the optical paths are aligned). The upper side reinforcing member 392 is arranged to an upper surface of the body part 310, and is arranged in parallel to the optical fiber holes 340 (optical paths). On the other hand, the lower side reinforcing member 391 is arranged to a lower surface of the body part 310, and is a plate-like member that is perpendicular to optical signals that enter or exit the optical signal surface 360. The lower side reinforcing member 391 and the upper side reinforcing member 392 are not provided to the connector-side end-face (rear-side end-face) of the body part 310.

The lower side reinforcing member 391 has a light passing window 391A. The light passing window 391A is an opening to let optical signals pass through, and is open along the left-right direction. The light passing window 391A is arranged in a position opposing the light signal surface 360 of the body part 310. Because the lower side reinforcing member 391 has the light passing window 391A, it is possible to arrange the lower side reinforcing member 391 so as to intersect the optical paths.

Also in the fourth embodiment, since the lower side reinforcing member 391 with a small coefficient of linear expansion has been provided, expansion and contraction of the body part 310 in the left-right direction due to temperature change can be suppressed (misalignment in respect to the light guide substrate can be suppressed). Further, as described above, the connector-side end-face (rear-side end-face) of the body part 310 is not provided with the lower side reinforcing member 391 and the upper side reinforcing member 392 (the coefficient of linear expansion is large in the connector-side end-face). Thus, in the connector-side end-face, misalignment in respect to the optical connector 20 can also be suppressed.

In the fourth embodiment, the upper side reinforcing member 392 and the lower side reinforcing member 391 are arranged opposed so as to sandwich the body part 310 from above and below. In this way, the optical paths in the body part 310 are to be arranged between the upper side reinforcing member 392 and the lower side reinforcing member 391. In this way, the body part 310 is suppressed from curving, and temperature change of the optical paths can be suppressed. Only one of the upper side reinforcing member 392 and the lower side reinforcing member 391 may be provided, however.

Other Points

The above embodiment is to facilitate understanding of this invention, and does not limit understanding of this invention. This invention may be changed or modified without departing from the scope thereof, and it is needless to say that this invention includes its equivalents.

What is claimed is:

1. An optical repeater to be arranged between a substrate and an optical connector, the optical repeater comprising:
   a body part including a plurality of optical paths to transmit an optical signal between the substrate and the optical connector, a substrate-side end-face in which one end of each of the optical paths opposes the substrate, and a connector connecting part to connect another end of each of the optical paths to the optical connector, the body part being configured from a material with a greater coefficient of linear expansion than that of the substrate; and
   a reinforcing member arranged so as to surround the optical paths in a side to the substrate-side end-face, the reinforcing member being configured from a material with a smaller coefficient of linear expansion than that of the body part.

2. An optical repeater according to claim 1, wherein
   the substrate-side end-face is arranged with a plurality of end-faces of optical fibers configuring the optical paths, and
   the reinforcing member is configured so as to surround a periphery of the plurality of the optical fibers.

3. An optical repeater according to claim 2, wherein
   the reinforcing member is configured so as to surround a periphery of each of the plurality of the optical fibers.

4. An optical repeater according to claim 1, wherein
   the substrate-side end-face is provided with a recess and a plurality of lens parts that have been formed in the optical paths of the recess, and
   the reinforcing member is configured so as to surround a periphery of the end-faces of the plurality of the optical fibers configuring the optical paths, a periphery of the plurality of the lens parts, and a light transmission part configuring the optical paths between the end-faces of the optical fibers and the lens parts.

5. An optical repeater according to claim 1, wherein
   the substrate-side end-face is provided with a positioning part that engages with a substrate side positioning part that has been formed in the substrate.

6. An optical repeater according to claim 5, wherein
   the reinforcing member is configured so as to surround the optical paths and the positioning part.

7. An optical repeater according to claim 1, wherein
   the substrate-side end-face is provided with the plurality of the lens parts that have been formed in the optical paths, the body part has a reflecting part that changes the optical paths between the end-faces of the optical fibers configuring the optical paths and the lens parts, the plurality of the optical fiber end-faces and the reflecting part are arranged sandwiched with the two reinforcing members, and one of the two reinforcing members is configured so as to surround a periphery of the plurality of the lens parts.

8. An optical connector device comprising:

a substrate;

an optical connector; and an optical repeater to be arranged between the substrate and the optical connector, wherein the optical repeater includes a body part including a plurality of optical paths to transmit an optical signal between the substrate and the optical connector, a substrate-side end-face in which one end of each of the optical paths opposes the substrate, and a connector connecting part to connect another end of each of the optical paths to the optical connector, the body part being configured from a material with a greater coefficient of linear expansion than that of the substrate, and a reinforcing member arranged so as to surround the optical paths in a side to the substrate-side end-face, the reinforcing member being configured from a material with a smaller coefficient of linear expansion than that of the body part.

* * * * *